Nov. 3, 1925.  
O. P. NOISOM  
1,560,482  
DIRECTION INDICATOR FOR VEHICLES  
Filed Aug. 22, 1921
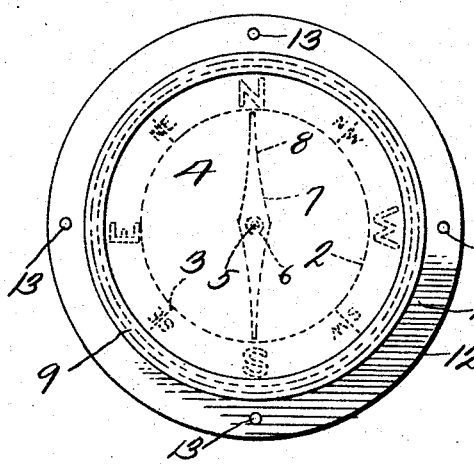
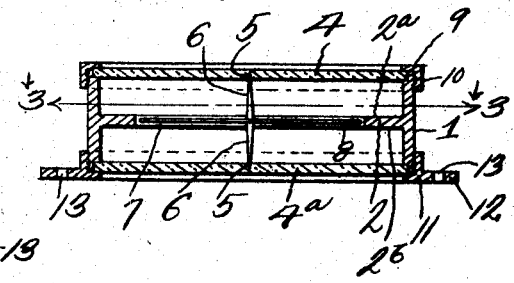
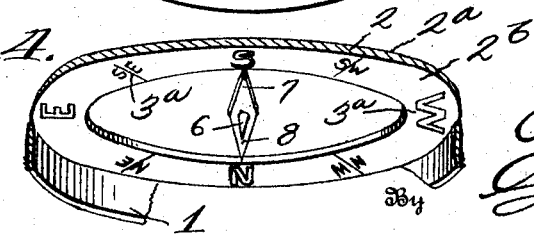
Inventor  
Ole P. Noisom  
By George L. Oltsch  
Attorney Patented Nov. 3, 1925.

1,560,482

UNITED STATES PATENT OFFICE.

OLE P. NOISOM, OF SOUTH BEND, INDIANA.

DIRECTION INDICATOR FOR VEHICLES.

Application filed August 22, 1921. Serial No. 494,217.

*To all whom it may concern:*

Be it known that I, Ole P. Noisom, a citizen of the United States, residing at South Bend, in the county of St. Joseph and State of Indiana, have invented certain new and useful Improvements in Direction Indicators for Vehicles, of which the following is a specification.

The invention relates to compasses and has for its object to provide a compass particularly adapted for use in connection with automobiles, and so constructed that the dial moves with the vehicle around the needle, and the dial so marked that the needle will indicate the direction of movement of the vehicle. Also to so construct the compass that it may be supported in a horizontal plane adjacent the operator and its dial marked in such a manner that when the vehicle turns the direction of movement of the vehicle will be indicated and the compass when suspended in a horizontal plane, and secured to the hood of a vehicle, will present to the eye of the operator a second scale thereby allowing the same compass to be used in a reversed position.

A further object is to provide a compass comprising a cylindrical body having an inwardly extending annular flange on the opposite faces of which compass graduations are disposed, a needle having bearings in transparent members at the ends of the cylindrical member and cooperating with the compass graduations. Also to provide a flanged base threaded on one end of the cylindrical body, and an annular retaining ring threaded on the other end of the cylindrical body, said base and ring being interchangeable, thereby allowing the device to be supported on the under side of a support, or on the upper side of a support without reversing the compass, and providing two scales.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a top plan view of the compass.

Figure 2 is a transverse sectional view through the compass.

Figure 3 is a horizontal sectional view through the compass taken on line 3—3 of Figure 2.

Figure 4 is a detail bottom perspective of the compass dial.

Referring to the drawings, the numeral 1 designates an annular body member, which body member intermediate its ends is provided with an inwardly extending dial flange 2, on which flange compass graduations 3 are placed, said graduations 3 being disposed on the upper side $2^a$ of the compass, and are used for ascertaining the direction of movement of the vehicle, when the compass is supported in a horizontal plane on the vehicle at a point below the operator's eyes. The under face $2^b$ of the flange 2 is provided with compass graduations $3^a$, which graduations are utilized when the compass as a whole is secured to the under side of the top, at which time the operator would look upwardly to make a compass reading. If the two dials were not provided it is obvious that when the compass is reversed in position the dial would be reversed and consequently a correct reading could not be made. The positioning of the compass is preferably overhead to the underside of the top thereby removing the compass to a point remote from the metallic parts of the vehicle and consequently the compass will have a greater degree of accuracy.

Disposed in the end of the body member 1 are transparent members 4 and $4^a$, said members being provided with bearings 5 which receive the pintles 6 of the needle 7. Needle 7 is preferably in the same horizontal plane as the flange 2, and its positive end 8 points to the north at all times, and the casing and scale moves around the needle. When the compass is installed the same is positioned so that its north and south graduations will be in alignment with the longitudinal center of the vehicle, therefore it will be seen that as the vehicle turns in the direction of the arrow $a$ that the compass casing as a whole will move in the same direction and that the positive end 8 of the needle 7 will indicate on the scale 3 the direction of travel of vehicle. It will be noted that the scale has its east and west graduations in reversed positions to normal so that when the scale moves the proper direction of movement of the vehicle will be indicated, which would not be the case if the scale were not reversed.

Threaded on the upper end of the cylindrical body member 1 is a retaining ring 9, which ring braces the upper end of the cylindrical member, helps to maintain the glass 4 in position and also forms a finish for concealing the thread 10 when the base 11 is threaded on the opposite end of the casing 1, as shown in Figure 2, at which time the parts are in position for the compass to be used at a point below the operator's eyes. The base member 11 is provided with a flange 12 having apertures 13 therein for the reception of screws, and by means of which flange the compass as a whole may be secured to a support by screws passing through the apertures 13. When it is desired to secure a compass to the under side of a top of a vehicle, the base 11 and the retaining ring 9 are reversed in position, thereby allowing the device as a whole to be secured to the underside of the top of a vehicle without reversing the east and west graduations.

From the above it will be seen that a compass is provided for motor driven vehicles, which compass may be easily read from the top or bottom thereof and so constructed and provided with graduations that the direction of movement of the vehicle will be accurately indicated.

The invention having been set forth what is claimed as new and useful is:—

A vehicle compass comprising a casing, transparent covers at the ends of said casing, an inwardly extending annular horizontally disposed flange within the casing and spaced from the ends thereof, a horizontally disposed magnetic needle disposed within the casing and in registration with the horizontally disposed flange and cooperating with compass scale indicia on the upper and lower faces of the horizontally disposed flange said scales being in reverse relation, pintles carried by said needle and mounted in bearings in the transparent covers, the ends of said casing being threaded, a retaining ring threaded on one end of the casing, a flanged base threaded on the other end of the casing and forming means interchangeable with the retaining ring for supporting the casing from either of its ends, whereby the scale indicia on the horizontally disposed flange will read from right to left when the flange is on either end of the casing.

In testimony whereof I affix my signature.

OLE P. NOISOM.